UNITED STATES PATENT OFFICE.

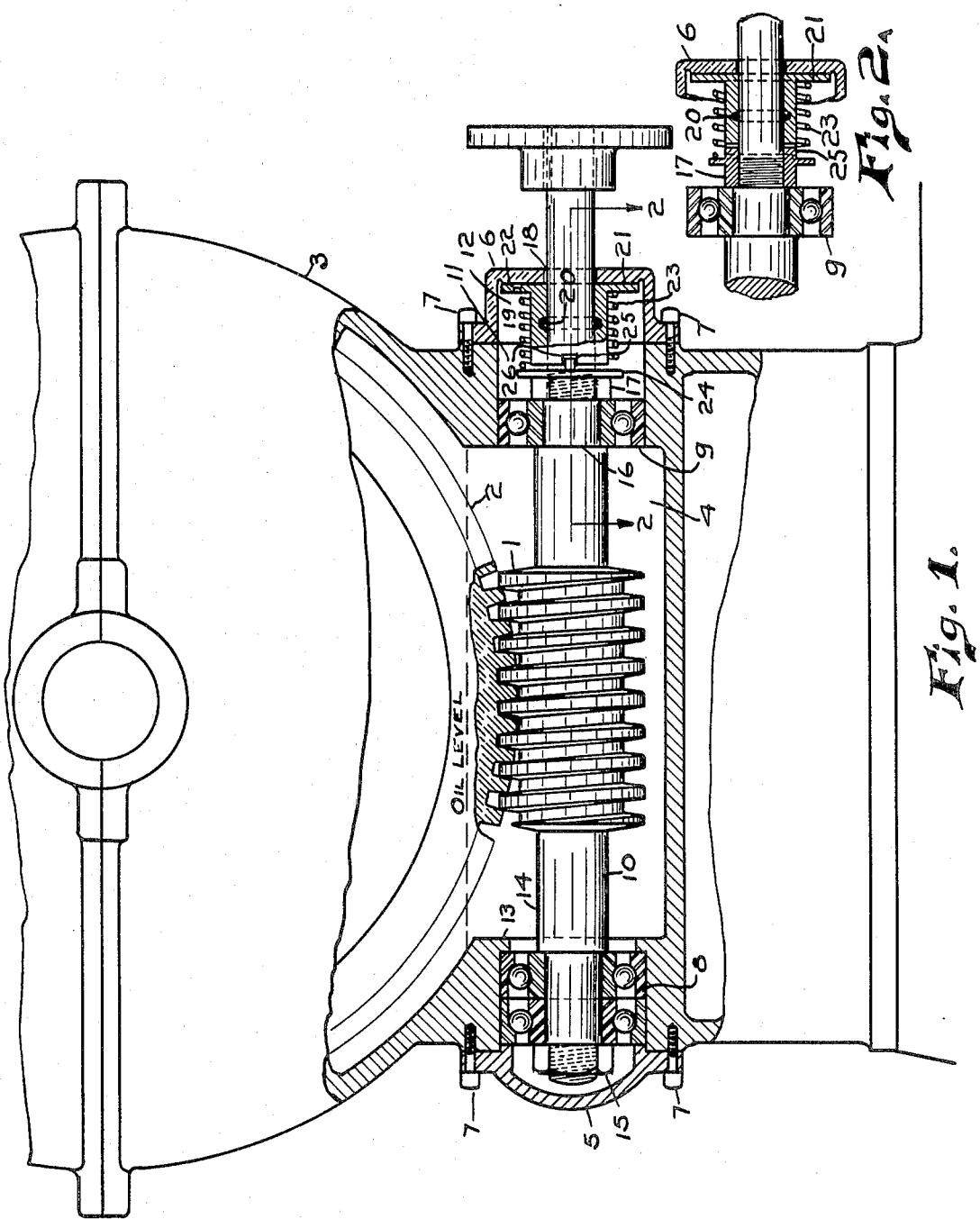

LUTHER RINGER, OF EDEN, NEW YORK, ASSIGNOR OF ONE-HALF TO LOUIS M. MUNDIE, OF EDEN, NEW YORK.

SHAFT CASING.

1,417,349.   Specification of Letters Patent.   Patented May 23, 1922.

Application filed October 6, 1921. Serial No. 505,917.

*To all whom it may concern:*

Be it known that I, LUTHER RINGER, a citizen of the United States, residing at Eden, in the county of Erie and State of New York, have invented certain new and useful Improvements in Shaft Casings, of which the following is a specification.

This invention relates to shaft casings which have an oil chamber incorporated therewith, the features of improvement relating to means employed in substitution for the usual stuffing box for the purpose of preventing the escape of oil from an end of the oil chamber.

The objects of the invention are to provide an oil retaining means which shall be simply constructed, easily accessible, highly efficient and substantially permanent in its oil sealing effect, and wear-compensating.

With the above objects in view the invention consists in novel features of structure and combination which will be set forth in detail as the description proceeds.

An embodiment of the invention is illustrated in the accompanying drawing in which:

Figure 1 is a side elevation of the casing broken away to show a longitudinal sectional view of the oil chamber and its associated parts.

Figure 2 is a longitudinal sectional view on the line 2—2 of Figure 1.

The invention is shown in the drawing in connection with gearing which comprises a worm 1 and a worm wheel 2. These elements are mounted in the casing 3 whose lower portion is fashioned to provide an oil chamber 4 in which the worm 1 is arranged, the oil level, which is preferably located above the worm 1 being indicated by the broken line so designated.

The chamber 4 has openings in its end walls which are normally closed by heads 5 and 6 secured by screws 7 to said end walls, which openings serve for the accommodation of bearings 8 and 9 for the shaft 10 of the worm 1, said shaft having a reduced portion which projects through an opening 18 in the head 6. The said shaft and worm are removable through the opening 11 which is closed by the head 6 and which forms part of a chamber in which the oil sealing means of the present invention is enclosed, said chamber being completed by a recess 12 formed internally of the head 6.

The bearings 8 and 9 are preferably ball bearings of any suitable type. The bearings 8 are held in position in the wall of the casing by the clamping cooperation of the head 5 with an annular retaining shoulder 13 at the inner end of the opening in which said bearings are fitted. The bearings 8 are also held against movement longitudinally of the shaft 10 by the clamping cooperation of a shoulder 14 formed on said shaft and a nut 15 fitted on the end of the shaft adjacent the head 5. The bearing 9 is held against longitudinal movement relatively to the shaft 10 by the clamping cooperation of a shoulder 16 formed on the shaft and engaging said bearing within the chamber 4 and a nut 17 fitted on the shaft and engaging said bearing within the chamber 11—12.

The oil sealing means includes a sleeve 19 mounted for longitudinal movement on the shaft 10 but held against turning movement relatively to said shaft, said sleeve being essentially provided with shaft packing 20 fitted in an annular groove in its bore and with a circumscribing end flange 21 which bears with sealing effect against the head 6. The engaging faces of said flange and head are preferably machined to secure the best results and in order to provide for the lubrication of the engaging faces, thereby to prevent them from grinding against one another, the flange 21 is formed with a small oil duct 22.

The flange 21 is pressed against the head 6 by a suitable spring 23, preferably a helical spring which surrounds the sleeve 19 and is arranged between the flange and an annular shoulder 24. The shoulder 24 is non-rotatable with respect to the shaft 10 and for this purpose may be cast with or otherwise suitably fitted to the nut 17. The shoulder 24 may also be conveniently used for the non-rotatable connection of the sleeve 19 to the shaft 10 and for this purpose said shoulder is provided with diametrically alining lugs 25 which engage diametrically alining grooves 26 in the adjacent end face of the sleeve 19 and function as keys to transmit the rotation of the shaft 10 to the said sleeve.

It will be apparent that the packing 20 prevents leakage of the oil along the shaft 10 and that since said packing rotates with the shaft it is not subject to wear, whereby its sealing effect is substantially permanent and it will have a long efficient life. It will also be apparent that a substantially effective seal against the escape of oil through the head 6 is provided by the flange 21, the amount of oil passed by the duct 22 being negligible and merely sufficient to provide necessary lubrication for the engaging faces of said head and said flange so that, in practical effect, there is no appreciable leakage of oil at the opening 18 through which the shaft 10 projects. It will also be apparent that any wear of the engaging faces of the flange 21 and head 6 is compensated by the spring 23 which acts with constant effect to press the flange 21 against the head 6.

Having fully described my invention, I claim:

1. The combination with an oil chamber and a shaft operating in said chamber of means for preventing the escape of oil from said chamber comprising a head secured to said chamber as an end closure therefor and having an opening through which said shaft projects, a sleeve mounted slidably but non-rotatably on said shaft and formed to engage the inner face of said head with sealing effect, said sleeve being also formed to engage said shaft with sealing effect, and means for constantly pressing said sleeve against said head.

2. The combination with an oil chamber and a shaft operating in said chamber of means for preventing the escape of oil from said chamber comprising a head secured to said chamber as an end closure therefor and having an opening through which said shaft projects, a sleeve mounted slidably but non-rotatably on said shaft and formed to engage the inner face of said head with sealing effect, said sleeve having an oil duct open to the face of said head which it engages and being also formed to engage said shaft with sealing effect, and means for constantly pressing said sleeve against said head.

3. The combination with an oil chamber and a shaft operating in said chamber of means for preventing the escape of oil from said chamber comprising a head secured to said chamber as an end closure therefor and having an opening through which said shaft projects, a sleeve mounted slidably on said shaft and having a flange to engage the inner face of said head with sealing effect, said sleeve being also formed to engage said shaft with sealing effect, a shoulder held against longitudinal and turning movement with respect to said shaft and having projecting lugs, said sleeve having grooves in which said lugs engage as keys and a spring constantly pressing said sleeve against said head, said spring surrounding said sleeve and bearing against said flange and said shoulder.

4. The combination with an oil chamber and a shaft operating in said chamber of means for preventing the escape of oil from said chamber comprising a head secured to said chamber as an end closure therefor and having an opening through which said shaft projects, a sleeve mounted slidably but non-rotatably on said shaft and formed to engage the inner face of said head with sealing effect, said sleeve having an oil duct open to the face of said head which it engages, said sleeve being also provided with packing surrounding and engaging said head with sealing effect, and means for constantly pressing said sleeve against said head.

5. The combination with an oil chamber, a shaft operating in said chamber and a bearing for the shaft fitted in an end of said chamber of a nut fitted on said shaft and engaging said bearing to hold the same against endwise movement on said shaft and means for preventing the escape of oil from said chamber comprising a head secured to said chamber as as end closure therefor and having an opening through which said shaft projects, a sleeve mounted slidably upon said shaft and having a flange to engage the inner face of said head with sealing effect, said sleeve also being formed to engage said shaft with sealing effect, a shoulder carried by said nut and rotatable with said shaft, said shoulder having projecting lugs and said sleeve having grooves in which said lugs engage as keys and a spring for constantly pressing said sleeve against said head, said spring surrounding said sleeve and bearing against said shoulder and said flange.

In testimony whereof I affix my signature.

LUTHER RINGER.